US008135347B2

(12) United States Patent
Ohkita

(10) Patent No.: US 8,135,347 B2
(45) Date of Patent: Mar. 13, 2012

(54) ELECTRONIC APPARATUS AND COMMUNICATION STATE NOTIFICATION METHOD

(75) Inventor: Hideki Ohkita, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 12/619,576

(22) Filed: Nov. 16, 2009

(65) Prior Publication Data

US 2010/0184374 A1 Jul. 22, 2010

(30) Foreign Application Priority Data

Jan. 16, 2009 (JP) ................................. 2009-008085

(51) Int. Cl.
*H04B 7/00* (2006.01)
(52) U.S. Cl. ...................................................... 455/41.2
(58) Field of Classification Search .................. 455/41.2
See application file for complete search history.

(56) References Cited

U.S. PATENT DOCUMENTS

2003/0146977 A1* 8/2003 Vale et al. .................. 348/207.1

FOREIGN PATENT DOCUMENTS

| JP | 07-066893 | | 3/1995 |
| JP | H11-017830 | A | 1/1999 |
| JP | 2005-191899 | A | 7/2005 |
| JP | 2007-006377 | A | 1/2007 |
| JP | 2008-193656 | | 8/2008 |

OTHER PUBLICATIONS

Notice of Reasons for Rejection mailed by Japan Patent Office on Mar. 2, 2010 in the corresponding Japanese patent application No. 2009-008085.
Explanation of Non-English Language References.

\* cited by examiner

*Primary Examiner* — Temesgh Ghebretinsae
*Assistant Examiner* — David Bilodeau
(74) *Attorney, Agent, or Firm* — Knobbe Martens Olson & Bear, LLP

(57) ABSTRACT

According to one embodiment, an electronic apparatus includes a communication module, a content information acquisition module, and a communication state notification module. The communication module executes close proximity wireless transfer. The content information acquisition module acquires content information about at least one content item to be transmitted between the communication module and an external device by negotiation. The communication state notification module executes either a first communication state notification processing of outputting a start tone indicative of start of transmission of the at least one content item and an end tone indicative of end of transmission of the at least one content item or a second communication state notification processing of suppressing output of the start tone and outputting the end tone, based on the acquired content information, when the at least one content item is transmitted between the communication module and the external device.

8 Claims, 7 Drawing Sheets

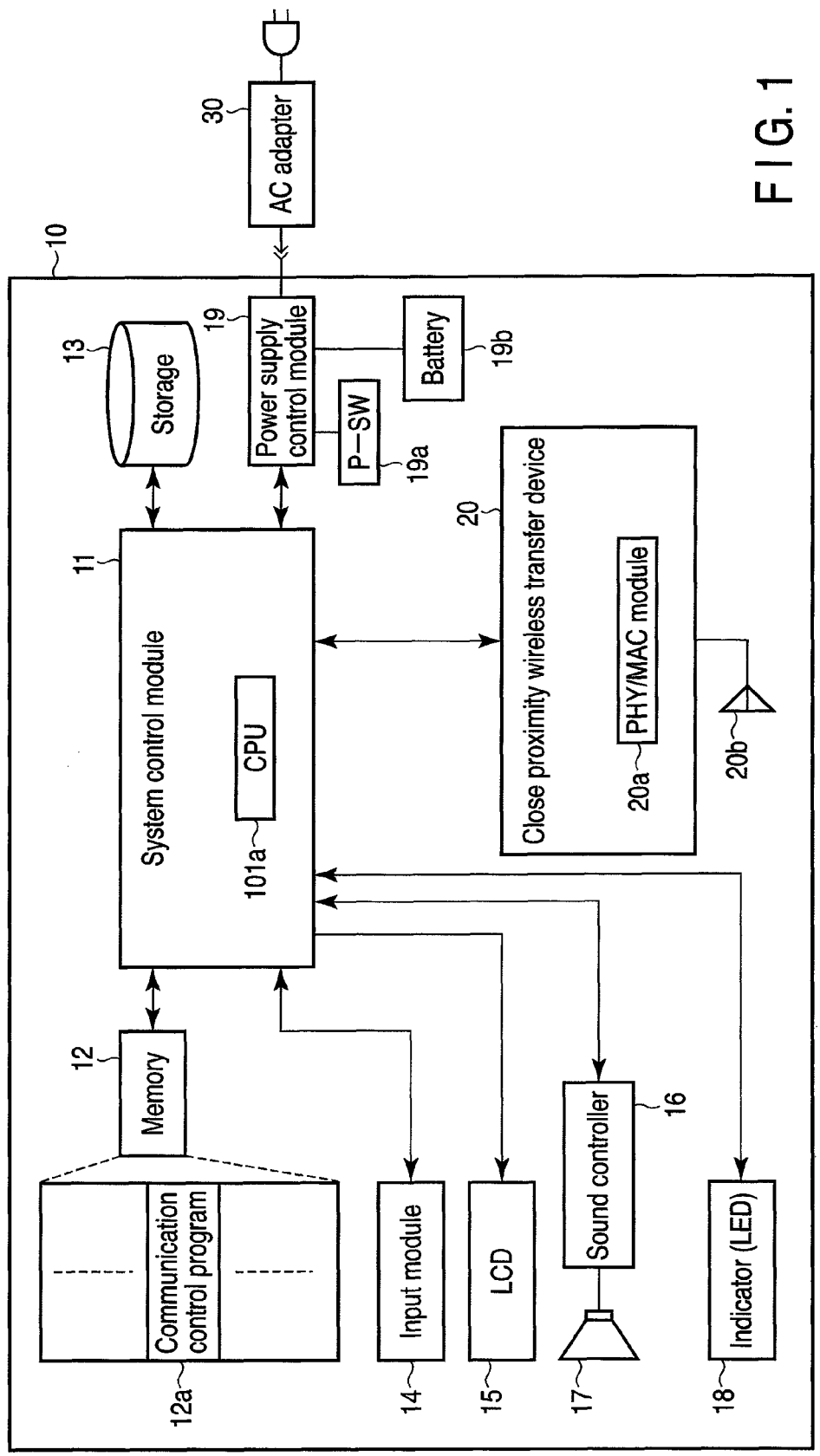
F I G. 1

ELECTRONIC APPARATUS AND COMMUNICATION STATE NOTIFICATION METHOD

CROSS-REFERENCE TO RELATED APPLICATIONS

This application is based upon and claims the benefit of priority from Japanese Patent Application No. 2009-008085, filed Jan. 16, 2009, the entire contents of which are incorporated herein by reference.

BACKGROUND

1. Field

One embodiment of the invention relates to an electronic apparatus for executing close proximity wireless transfer, and a communication state notification method applied to the apparatus.

2. Description of the Related Art

In recent years, wireless communication such as NFC has been used in IC cards, mobile phones, and the like. The user can readily make communication for, e.g., authentication processing and charging merely by holding an IC card or mobile phone over a reader/writer module of a host apparatus.

A new close proximity wireless transfer technique which allows communication at higher speed has been developed these days. The new close proximity wireless transfer technique makes it possible to exchange data files such as document data, image data, and audio data between devices as well as authentication and charging services, merely by bringing the devices close to each other.

The time required for wireless communication for, e.g., an authentication processing service is instant (e.g., at most several seconds). However, a period required to transfer data such as a large amount of file using close proximity wireless transfer is relatively long. Depending on the data size of a file, a communication time from several tens of seconds to several minutes may be necessary for transfer of the file.

Jpn. Pat. Appln. KOKAI Publication No. 11-17830 discloses a communication processing apparatus which outputs a chime tone from a loudspeaker upon establishment of connection with an external communication processing apparatus via a communication line. The user can readily determine the establishment of connection between the communication processing apparatuses by the chime tone, and efficiently transmit data.

In a close proximity wireless transfer technique, devices must be kept close to each other during communication. If the user accidentally moves one of the devices away from the other device during communication such as transmission of content data, the connection between the devices is released and then the transmission process fails. A communication time required for transmission varies depending on, e.g., the data size of content data to be transmitted or a transmission rate between the devices. To prevent an operation error by the user during communication, it is necessary to appropriately notify the user of the communication state and its switching.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing the system configuration of an electronic apparatus according to an embodiment of the invention;

DETAILED DESCRIPTION

Figure 2:
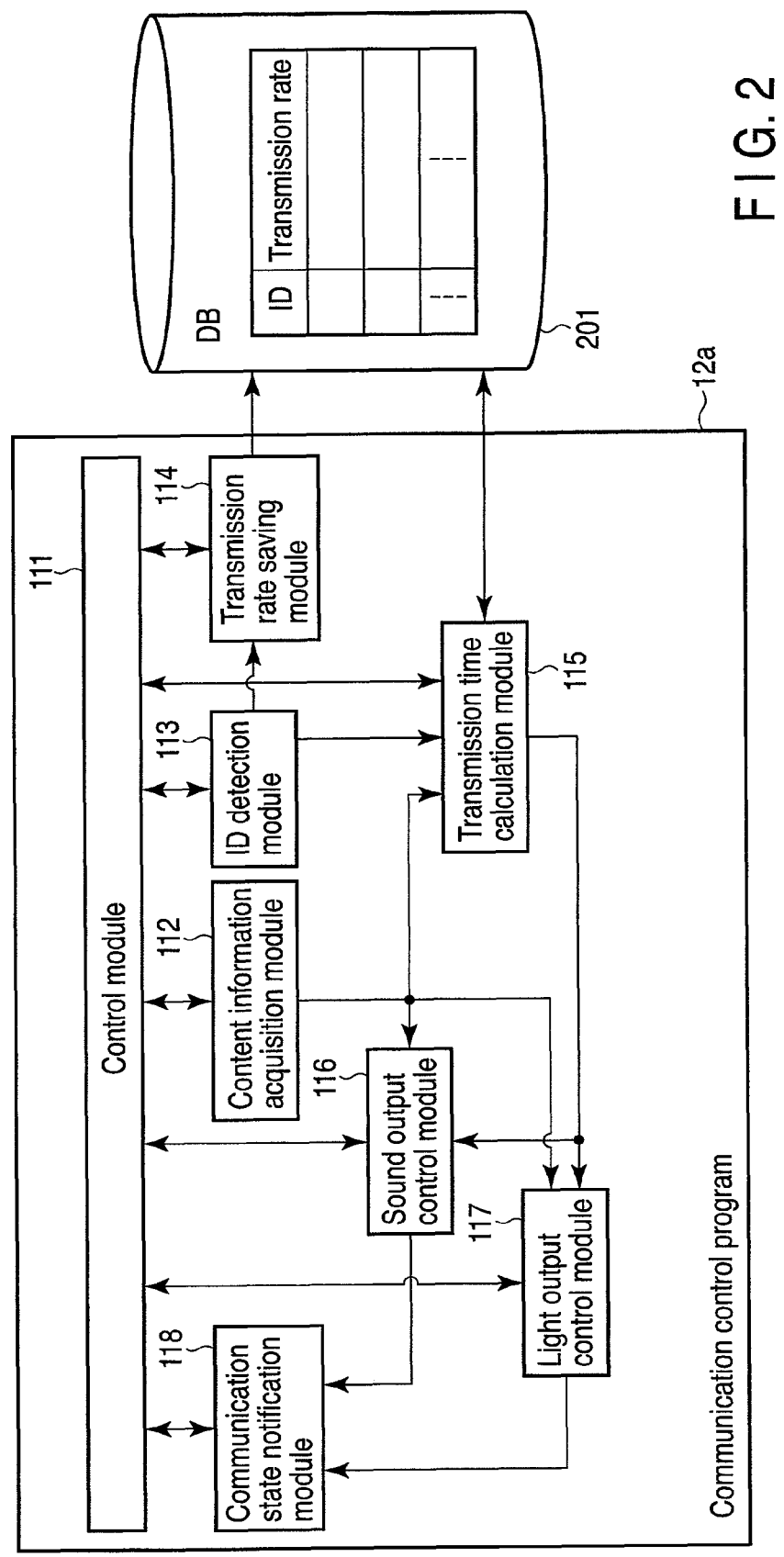
FIG. 2 is an exemplary block diagram showing the structure of a communication control program used in the electronic apparatus of the embodiment.

Various embodiments according to the invention will be described hereinafter with reference to the accompanying drawings. In general, according to one embodiment of the invention, there is provided an electronic apparatus comprising: a communication module configured to execute close proximity wireless transfer; a content information acquisition module configured to acquire content information about at least one content item to be transmitted between the communication module and an external device, by negotiation between the communication module and the external device; and a communication state notification module configured to execute either a first communication state notification processing of outputting a start tone indicative of start of transmission of said at least one content item and an end tone indicative of end of transmission of said at least one content item or a second communication state notification processing of suppressing output of the start tone and outputting the end tone, based on the acquired content information, when said at least one content item is transmitted between the communication module and the external device.

FIG. 1 shows the configuration of an electronic apparatus of an embodiment of the present invention. An electronic apparatus 10 is implemented as, e.g., a mobile apparatus (e.g., a mobile phone, PDA, or audio player), a personal computer, or a consumer apparatus (e.g., a TV or video recorder). The electronic apparatus 10 includes a system control module 11, memory 12, storage device 13, input module 14, liquid crystal display (LCD) 15, sound controller 16, loudspeaker 17, indicator 18, power supply control module 19, and close proximity wireless transfer device 20.

The system control module 11 controls the operation of the respective modules within the electronic apparatus 10. The system control module 11 is connected to the memory 12, storage device 13, input module 14, LCD 15, sound controller 16, indicator 18, power supply control module 19, and close proximity wireless transfer device 20. The system control module 11 includes a CPU 101a.

The CPU 101a is a processor for executing an operating system and various application programs/utility programs, which are loaded from the storage device 13 to the memory 12. The application programs/utility programs include a communication control program 12a for controlling the communication operation of the close proximity wireless transfer device 20. The communication control program 12a has a communication state notification function of notifying, using a sound or light, the user of the state (start of data transmission, end of data transmission, transmission rate, and the like) of close proximity wireless transfer executed by the close proximity wireless transfer device 20.

The storage device 13 is, e.g., a hard disk drive or a nonvolatile semiconductor memory. The input module 14 is an input device for inputting data and instructions to be sent to the CPU 101a. The input module 14 is implemented by, e.g., a keyboard, button switches, or a pointing device.

The LCD 15 is a display which is used as a display monitor of the electronic apparatus 10. The sound controller 16 is a sound generator for outputting a sound corresponding to audio data transmitted from the CPU 101a. The sound controller 16 converts the audio data transmitted by the CPU 101a from a digital audio signal to an analog audio signal, and then outputs it to the loudspeaker 17. The loudspeaker 17 outputs a sound corresponding to the analog audio signal.

The indicator 18 indicates the state of close proximity wireless transfer executed by the close proximity wireless transfer device 20. The indicator 18 includes a light emitting module such as an LED.

The power supply control module 19 uses electric power externally supplied via an AC adapter 30 or that supplied from a battery 19b provided within the electronic apparatus 10 to supply electric power to the respective modules of the electronic apparatus 10. In other words, the electronic apparatus 10 is driven by an external power supply such as an AC commercial power supply, or the battery 19b. It is also possible to provide the AC adapter 30 within the electronic apparatus 10. The power supply control module 19 powers on or off the electronic apparatus 10 in response to a user operation of a power switch (P-SW) 19a.

The close proximity wireless transfer device 20 is a communication module for executing close proximity wireless transfer. The close proximity wireless transfer device 20 establishes a wireless connection with another device (an external device) which exists within a predetermined distance from the close proximity wireless transfer device 20 and has a close proximity wireless transfer function. Then, the close proximity wireless transfer device 20 starts transmission of data such as a file. Close proximity wireless transfer between the close proximity wireless transfer device 20 and the external device is executed in a peer-to-peer manner. The range of communication is, e.g., 3 cm. It is possible to establish a wireless connection between the close proximity wireless transfer device 20 and the external device only when the distance between them falls within the range of communication (e.g., 3 cm). When the close proximity wireless transfer device 20 and the external device come within the range of communication, a wireless connection between them is established. Then, transmission of data such as data files explicitly designated by the user or those predetermined to be synchronized is performed between the close proximity wireless transfer device 20 and the external device.

Close proximity wireless transfer uses an induction electric field. As a close proximity wireless transfer method, TransferJet can be used. TransferJet is a close proximity wireless transfer method using UWB, and can realize high-speed data transfer.

The close proximity wireless transfer device 20 includes a PHY/MAC module 20a and an antenna 20b. The PHY/MAC module 20a operates under the control of the communication control program 12a executed by the CPU 101a. The PHY/MAC module 20a communicates with the external device via the antenna 20b. The antenna 20b is an electrode called a coupler, and transmits/receives data to/from the external device by a wireless signal using an induction electric field. When the external device comes within the range of communication (e.g., 3 cm) from the antenna 20b, the antennas (couplers) of the close proximity wireless transfer device 20 and external device are coupled by an induction electric field, thereby enabling wireless communication between the close proximity wireless transfer device 20 and the external device. Note that it is possible to implement the close proximity wireless transfer device 20 and the antenna 20b as one module.

The structure of the communication control program 12a will be explained with reference to FIG. 2.

The communication control program 12a includes a control module 111, content information acquisition module 112, ID detection module 113, transmission rate saving module 114, transmission time calculation module 115, sound output control module 116, light output control module 117, and communication state notification module 118.

The control module 111 controls a communication sequence between the close proximity wireless transfer device 20 and the external device. Wireless communication (close proximity wireless transfer) between the close proximity wireless transfer device 20 and the external device is executed according to the following procedure: (1) execute connection phase; (2) execute negotiation phase; and (3) execute data transmission phase.

In the connection phase, a connection request signal and a response signal to it are transmitted/received between the close proximity wireless transfer device 20 and the external device. That is, in close proximity wireless transfer, one of the two devices transmits a connection request signal. The other device executes processing of detecting a connection request signal at predetermined intervals. When one of the devices detects a connection request signal from the other device, it is possible to establish a wireless connection between them.

In the negotiation phase, for example, content information (data size, number, and type of files to be transmitted) about content data (document data files, image data files, audio data files, or the like) to be transmitted is exchanged between the devices.

In the data transmission phase, a source device transmits, to a destination device, data (content data) to be transmitted.

The content information acquisition module 112 acquires, as content information, information about content data (files) to be transmitted. The content information (content metadata) indicates the data size, number, and type of files to be transmitted. The content information acquisition module 112 exchanges the content information with the external device during the negotiation phase. The content information acquired by the content information acquisition module 112 is sent to each of the transmission time calculation module 115, sound output control module 116, and light output control module 117.

The ID detection module 113 detects the identifier (ID) of a communication target external device. The identifier (ID) is device identification information for identifying an external device. Each device having a close proximity wireless transfer function is assigned a unique device ID. A connection request signal or response signal from an external device can contain the device ID of the external device. In this case, the ID detection module 113 can detect the device ID of a communication target external device by acquiring it from a connection request signal or response signal received during the connection phase. The device ID detected by the ID detection module 113 is sent to each of the transmission rate saving module 114 and transmission time calculation module 115.

The transmission rate saving module 114 saves, in a database 201 of the storage device 13, the transmission rate of data transmitted using close proximity wireless transfer between a communication target external device and the close proximity wireless transfer device 20 in association with the identifier (device ID) of the communication target external device.

More specifically, the transmission rate saving module 114 saves, in the database 201, the transmission rate of data during the data transmission phase in association with the device ID detected by the ID detection module 113. The transmission rate is acquired by, e.g., measuring an exchange data amount (transmitted data amount or received data amount) per unit time during the data transmission phase in cooperation with the PHY/MAC module 20a of the close proximity wireless transfer device 20.

If the database 201 has already saved a transmission rate associated with the device ID of a communication target external device, the transmission rate saving module 114 executes, e.g., processing of updating the transmission rate saved in the database 201 with a newly measured transmission rate, or processing of updating the transmission rate saved in the database 201 with a value obtained by averaging the saved transmission rate and the newly measured transmission rate. Such update processing can keep the transmission rate saved in the database 201 close to the actual transmission rate.

The transmission time calculation module 115 estimates a transmission time to be taken to transmit, to the communication target external device, content data to be transmitted. More particularly, when close proximity wireless transfer is newly executed, the transmission time calculation module 115 extracts a transmission rate associated with the device ID of an external device as a new communication partner of the close proximity wireless transfer from the database 201. If the database 201 does not store the transmission rate associated with the device ID of the external device as the communication partner, a preset reference rate is used as a transmission rate. The transmission time calculation module 115 then calculates a transmission time by dividing the data size of the content data to be transmitted which have been input from the content information acquisition module 112 by the acquired transmission rate. The calculated transmission time is sent to the sound output control module 116 and light output control module 117.

Based on the content information and transmission time, the sound output control module 116 controls a sound output from the loudspeaker 17 by the communication state notification module 118. A sound output from the loudspeaker 17 indicates switching of the communication state such as start or end of transmission. Upon switching of the communication state, the sound output control module 116 sends, to the communication state notification module 118, a signal for controlling the timing of outputting a start tone (transmission start melody) indicating the start of transmission or an end tone (transmission end melody) indicating the end of transmission, and its duration.

Based on the content information and transmission time, the light output control module 117 controls light output from the indicator 18 by the communication state notification module 118. That is, the module 117 effects control to make the LED of the indicator 18 light continuously or flicker. The periods during which the LED of the indicator 18 is lit, flickering, or extinguished each indicate one communication state. The light output control module 117 sends, to the communication state notification module 118, a signal for controlling the timing to make the LED light continuously (flicker) and its duration based on the communication state in which, e.g., transmission has started or ended, or data is being transmitted.

The communication state notification module 118 performs processing for notifying the user of the communication state of close proximity wireless transfer being executed by the close proximity wireless transfer device 20. According to the control signal output from the sound output control module 116, the communication state notification module 118 outputs a start tone or end tone indicating the start or end of transmission of content data from the loudspeaker 17. Based on the control signal output from the light output control module 117, the communication state notification module 118 makes the LED of the indicator 18 light continuously or flicker to indicate that transmission of content data has started or ended, or the content data is being transmitted.

Note that although FIG. 2 shows the communication state notification module 118, sound output control module 116, and light output control module 117 as different modules, it is possible to implement them as one module.

An example of the outer appearance of the electronic apparatus 10 will be described with reference to FIG. 3 on the assumption that the electronic apparatus 10 is implemented as a portable personal computer.

Figure 3:
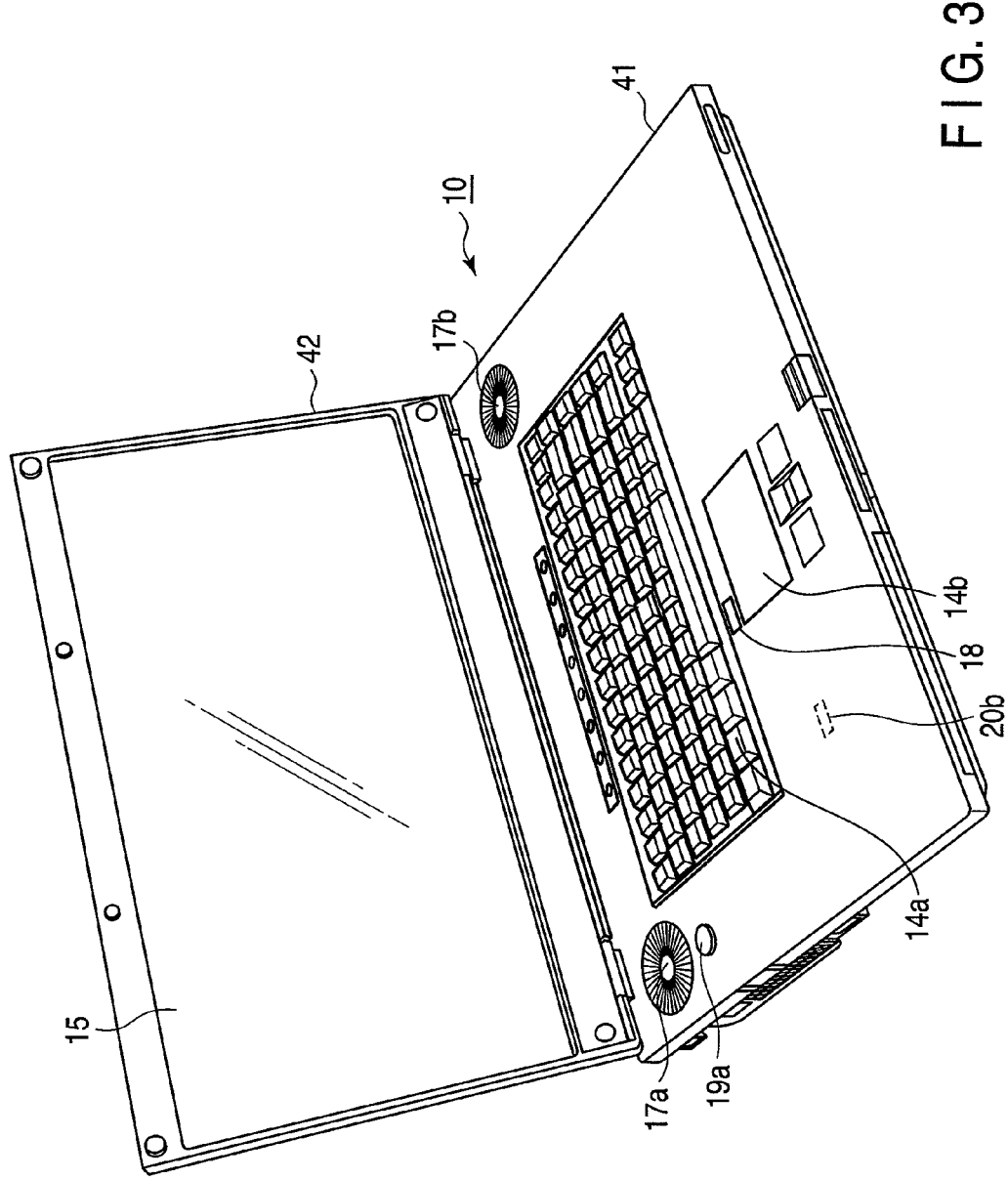
FIG. 3 is an exemplary perspective view showing the outer appearance of the electronic apparatus of the embodiment.

FIG. 3 is a perspective view showing the outer appearance of the electronic apparatus 10.

The electronic apparatus 10 includes a main body 41 and display unit 42. The display unit 42 is attached to the main body 41 to freely pivot between the open position where the upper surface of the main body 41 is exposed and the closed position where that upper surface is covered by the display unit 42. The above LCD 15 is provided within the display unit 42.

The main body 41 has a thin box-shaped housing. A keyboard 14a, a touchpad 14b, the loudspeakers 17a and 17b, the indicator 18, the power switch 19a, and the like are arranged on the upper surface of the housing of the main body 41.

The upper surface of the main body 41, more specifically, part of a palm rest on the upper surface of the main body 41 functions as a communication surface. That is, the close proximity wireless transfer device 20 and the antenna (coupler) 20b are arranged within the main body 41 to be opposite to the upper surface of the main body 41. The antenna (coupler) 20b is disposed to externally output a wireless signal (induction electric field) via the upper surface of the main body 41 (more specifically, part of the palm rest on the upper surface of the main body 41). A small region on the upper surface of the main body 41 opposite to the antenna (coupler) 20b, i.e., a small region positioned on the upper portion of the antenna (coupler) 20b on the upper surface of the main body 41 is used as a communication position. The close proximity wireless transfer device 20 executes, via the upper surface of the main body 41, close proximity wireless transfer with an external device existing within the predetermined range of wireless communication (e.g., 3 cm) from the communication position on the upper surface of the main body 41.

The user can start data transfer between an external device having a close proximity wireless transfer function and the electronic apparatus 10 by, e.g., an operation (to also be referred to as a touch operation) of holding the external device over the communication position on the upper surface of the main body 41.

Figure 4:
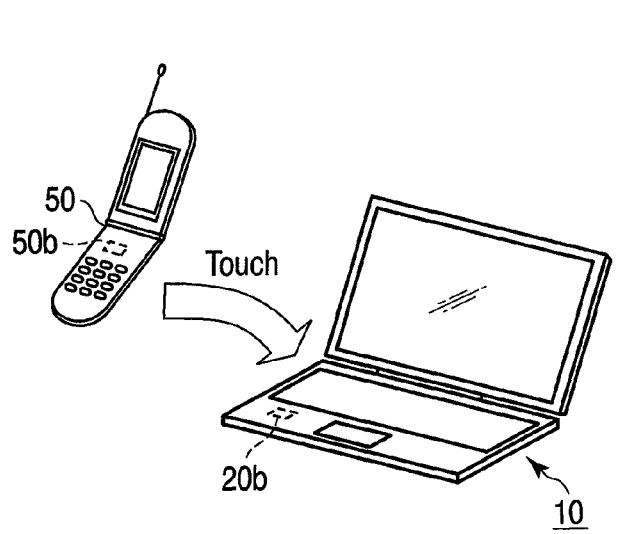
FIG. 4 is an exemplary view showing an example of close proximity wireless transfer executed between the electronic apparatus of the embodiment and an external device.

FIG. 4 shows close proximity wireless transfer executed between a mobile phone 50 and the electronic apparatus 10. An antenna (coupler) 50b for close proximity wireless transfer is arranged within a housing of the mobile phone 50 to be opposite to the rear surface of that housing. In this case, it is possible to start data transfer between the mobile phone 50 and the electronic apparatus 10 by holding the rear surface of the housing of the mobile phone 50 over the communication position on the upper surface of the main body 41 of the electronic apparatus 10.

Figure 5:
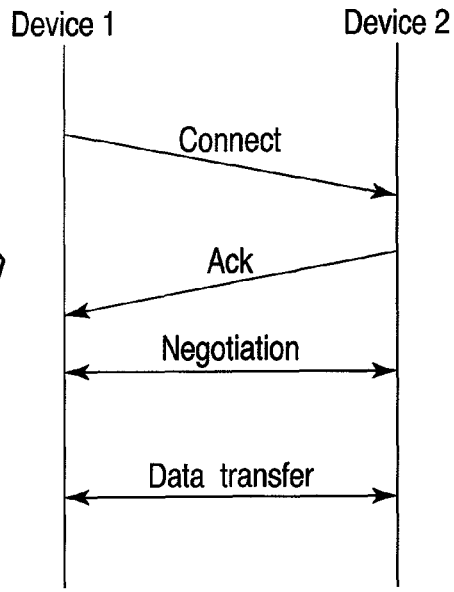
FIG. 5 is an exemplary sequence chart showing a communication sequence executed between the electronic apparatus of the embodiment and an external device.

A communication sequence executed between the electronic apparatus 10 and an external device will be explained next with reference to FIG. 5.

Assume that close proximity wireless transfer is executed between device 1 and device 2. One of devices 1 and 2 which wants to start communication, e.g., device 1, transmits a connection request signal (Connect). The connection request signal can contain the device ID of device 1 (e.g., the device ID of a close proximity wireless transfer device provided within device 1). Device 2 regularly executes processing of detecting a connection request signal. When devices 1 and 2 are close to each other, device 2 can detect the connection request signal transmitted by device 1. Upon detecting the connection request signal, device 2 transmits a response signal (Ack) to the connection request signal to device 1. The response signal (Ack) can contain the device ID of device 2 (e.g., the device ID of a close proximity wireless transfer device provided within device 2). Device 1 can detect the response signal (Ack) transmitted by device 2. It is possible to establish a wireless connection between devices 1 and 2 by transmitting/receiving the connection request signal/response signal in the above manner.

After that, negotiation processing is performed between devices 1 and 2. With this negotiation processing, information about content items to be transmitted is exchanged between devices 1 and 2. Data transmission between devices 1 and 2 is then started.

The electronic apparatus 10 can function as above device 1 or 2.

Figure 6:
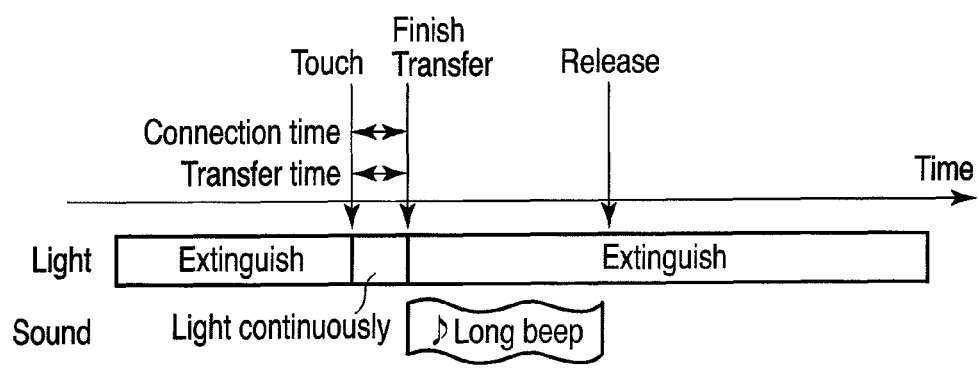
FIG. 6 is an exemplary view showing an example of a communication situation notified by a communication state notification module of the electronic apparatus of the embodiment.

An example of a communication situation notified by the communication state notification module 118 of the electronic apparatus 10 will now be explained with reference to FIG. 6.

Assume that it is possible to transmit content data to be transmitted between the electronic apparatus 10 and an external device within a very short time, e.g., a time less than a predetermined time.

When the electronic apparatus 10 and the external device are brought close to each other by a user touch operation, a connection between them is established, thereby enabling transmission of the content data. Upon start of transmission of the content data, the communication state notification module 118 makes the LED of the indicator 18 light continuously to notify the user of start of transmission. The communication state notification module 118 makes the LED of the indicator 18 flicker while the content data is being transmitted. At the end of transmission of the content data, the communication state notification module 118 makes the LED of the indicator 18 light continuously for a predetermined period and then extinguishes it. The module 118 also generates an end tone indicating the end of transmission and outputs it from the loudspeaker 17. With this processing, it is possible to notify the user of the end of transmission of the content data. A melody different from that for the start tone is used for the end tone, and therefore, the user can determine the start and end of transmission merely by the sound. When the user recognizes the end of transmission, and moves the external device a predetermined distance (3 cm) or more away from the electronic apparatus 10, the connection between the devices is released.

Assume that the time required to transmit the content data is very short (e.g., transmission instantaneously ends). In this case, if both the start tone indicating the start of transmission and the end tone indicating the end of transmission are output, the start and end tones may overlap each other or the end tone may be outputted after the actual end of transmission. This can confuse the user or cause the user to feel uncomfortable with the discord due to the overlapping of the start and end tones. For this reason, if the time required to transmit the content data is less than a predetermined time, communication state notification processing for suppressing output of the start tone and outputting the end tone is executed, thereby allowing the user to be notified of the transmission state of the content data without confusion. Note that to suppress output of the start tone, the electronic apparatus 10 does not output the start tone, or outputs the start tone for a shorter period than usual.

Figure 7:
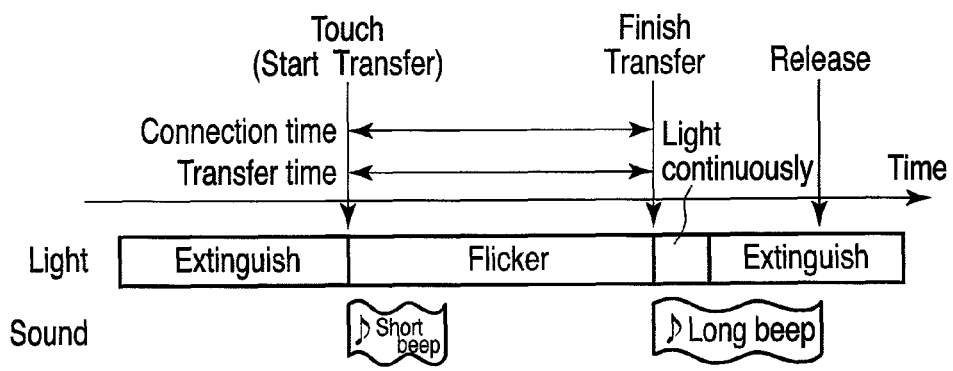
FIG. 7 is an exemplary view showing another example of the communication situation notified by the communication state notification module of the electronic apparatus of the embodiment.

FIG. 7 shows another example of the communication situation notified by the communication state notification module 118 of the electronic apparatus 10.

Assume that the amount of the content data to be transmitted between the electronic apparatus 10 and the external device is large, e.g., the time required for transmission is a predetermined time or more.

When the electronic apparatus 10 and the external device are brought close to each other by a user touch operation, it is possible to transmit the content data. Upon start of transmission of the content data, the communication state notification module 118 makes the LED of the indicator 18 flicker, and outputs the start tone from the loudspeaker 17 to notify the user of the start of transmission. At the end of transmission of the content data, the communication state notification module 118 makes the LED of the indicator 18 light continuously for a predetermined period and then extinguishes it. The module 118 also outputs the end tone indicating the end of transmission from the loudspeaker 17. A melody different from that for the start tone is used for the end tone, and therefore, the user can determine the start and end of transmission merely by the sound. When the user recognizes the end of transmission, and moves the external device the predetermined distance (3 cm) or more away from the electronic apparatus 10, the connection between the devices is released.

In this manner, the communication state notification module 118 can notify the user that transmission of the content data has started, that the content data is being transmitted, and that transmission of the content data has ended, by making the LED of the indicator 18 light continuously or flicker, and by outputting the melodies from the loudspeaker 17.

As described above, if it takes some time to transmit the content data (e.g., it takes about several tens of seconds) and only the end tone indicating the end of transmission is output, the user cannot recognize whether a connection has been established and whether transmission has started, thereby causing an operation error. For example, the user may move one device away from the other device during transmission. Therefore, if it takes some time to transmit the content data, the first communication state notification processing of outputting both the start tone indicating the start of transmission of the content data and the end tone indicating the end of transmission of the content data is executed and different melodies are used for the start and end tones, thereby enabling the user to determine the start and end of transmission. As for the melodies used for the start and end tones, for example, a short melody is used for the start tone and a long melody is used for the end tone. On the other hand, if it takes a short time to transmit the content data, the second communication state notification processing of suppressing output of the start tone and outputting only the end tone is executed to prevent a problem such as overlapping of the start and end tones from occurring.

That is, the electronic apparatus 10 determines based on the acquired content information whether the transmission time required to transmit the content data exceeds a threshold value. If the transmission time exceeds the threshold value, the electronic apparatus 10 executes the first communication state notification processing; otherwise, the electronic apparatus 10 executes the second communication state notification processing.

Figure 8:
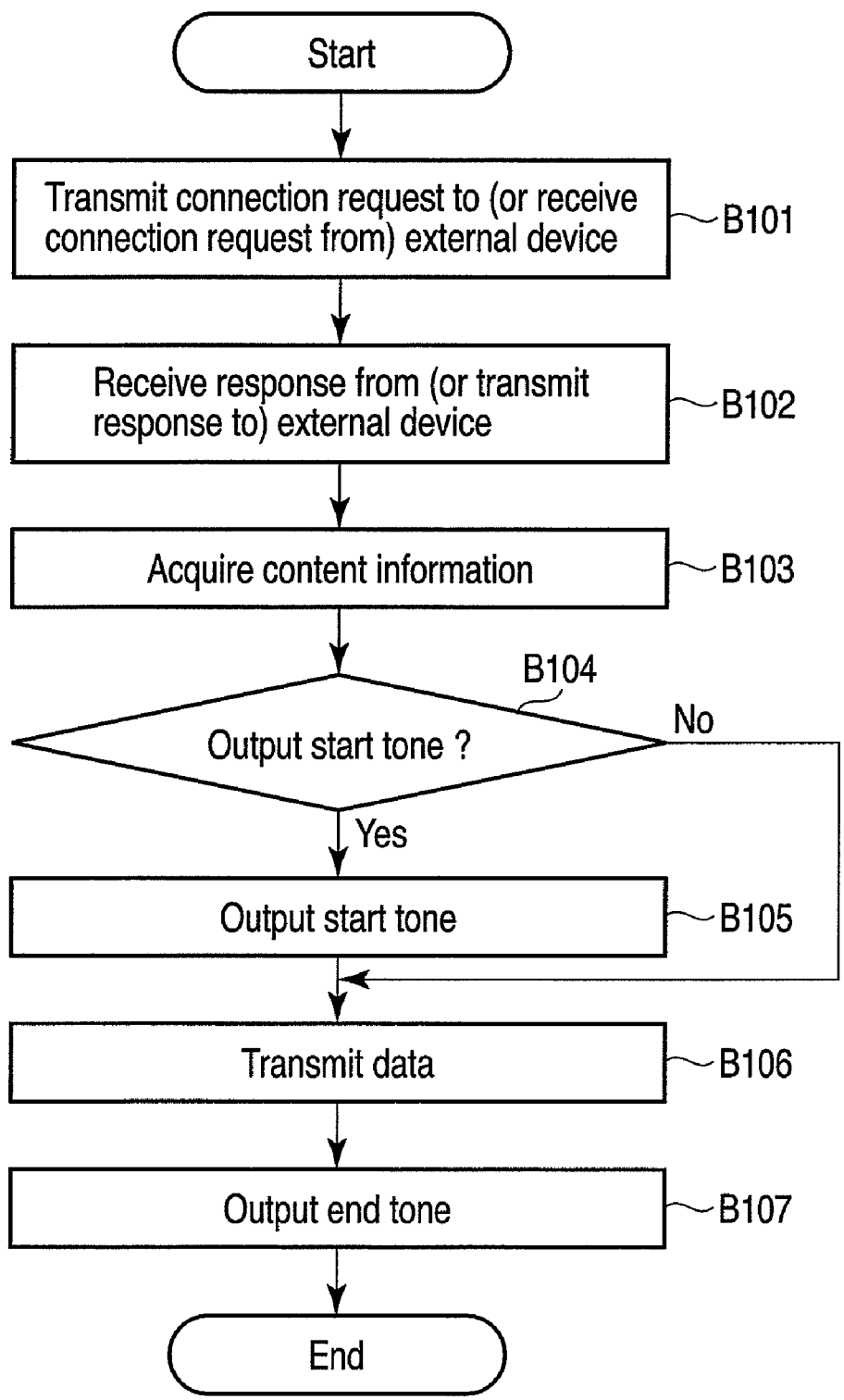
FIG. 8 is an exemplary flowchart for explaining a procedure of communication processing executed by the electronic apparatus of the embodiment.

An example of a procedure of the communication processing executed by the electronic apparatus 10 will be described next with reference to a flowchart in FIG. 8.

Connection modes in the close proximity wireless transfer method include an initiator mode and a responder mode. A device set in the initiator mode, i.e., an initiator functions as a master device, and transmits a connection request to another device. A device set in the responder mode, i.e., a responder functions as a slave device, and detects the connection request transmitted from the initiator. When the initiator and responder come close to each other, a connection between them is established. The communication control program 12a controls the close proximity wireless transfer device 20, and sets the connection mode of the close proximity wireless transfer device 20 in the initiator or responder mode.

If the close proximity wireless transfer device 20 is set in the initiator mode, it transmits a connection request signal to an external device (block B101). The connection request signal contains the device ID of the close proximity wireless transfer device 20. The close proximity wireless transfer device 20 stands by for a response signal from the external device. Upon receiving a response signal from the external device (block B102), a wireless connection between the close proximity wireless transfer device 20 and the external device is established.

Alternatively, if the close proximity wireless transfer device 20 is set in the responder mode, it regularly executes processing of detecting a connection request signal from an external device (block B101). The connection request signal contains the device ID of the external device. Upon receiving a connection request signal from the external device, the close proximity wireless transfer device 20 transmits a response signal added with its device ID to the external device (block B102).

The communication control program 12a executes negotiation processing with the external device as a communication partner to determine content data to be transmitted. With the negotiation processing, the communication control program 12a acquires content information about the content data to be transmitted (block B103). If the electronic apparatus 10 transmits the content data to the external device, the communication control program 12a generates content information based on the content data to be transmitted. Alternatively, if the electronic apparatus 10 receives the content data from the external device, the communication control program 12a detects content information contained in the data transmitted from the external device in the negotiation processing. The content information indicates various attributes of the content data to be transmitted. More specifically, the content information represents, e.g., the data size, number, and type of files to be transmitted.

The communication control program 12a determines based on the content information whether to output a start tone (transmission start melody) indicating the start of transmission of the content data (block B104). If data transmission is expected to end within a very short time based on the content information, the communication control program 12a does not output the start tone; otherwise, the program 12a outputs the start tone. Therefore, the communication control program 12a does not output the start tone, for example, when the transmission time is less than a predetermined time, when the number of files to be transmitted is less than a predetermined number, when the data size of files to be transmitted is less than a predetermined size, or when the type of files to be transmitted is not a predetermined type.

If the start tone indicating the start of transmission of the content data is to be output (YES in block B104), the communication control program 12a outputs the start tone from the loudspeaker 17 (block B105).

After the start tone is output in block B105, or if the communication control program 12a does not output the start tone indicating the start of transmission of the content data (NO in block B104), the program 12a executes processing of transmitting the content data to be transmitted (block B106). At the end of transmission of the content data, the communication control program 12a outputs the end tone from the loudspeaker 17 (block B107).

With the above processing, it is possible to appropriately notify the user of the transmission situation of the content data by executing the communication state notification processing which does not output the start tone if the transmission time required to transmit the content data is very short, and outputs the start tone if the transmission time is long. Note that if the transmission time required to transmit the content data is very short, a start tone may be output by, e.g., generating a normal start tone halfway or generating a start tone which is shorter than the normal start tone.

In the above flowchart, notification by a sound output from the loudspeaker 17 has only been mentioned. However, based on the content information and transmission time, it is possible to control notification by making the LED of the indicator 18 light continuously or flicker.

Figure 9:
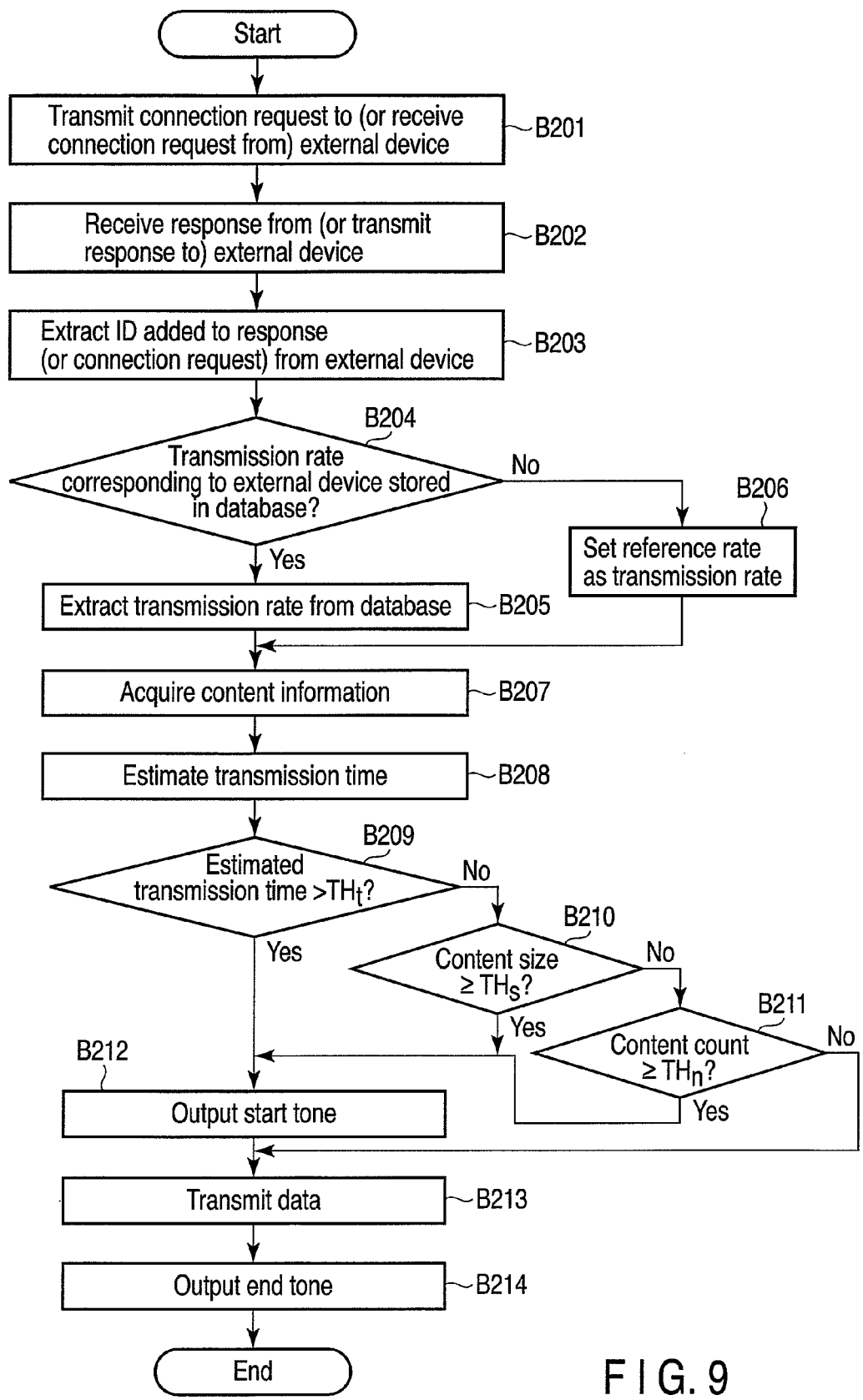
FIG. 9 is an exemplary flowchart for explaining a detailed procedure of the communication processing executed by the electronic apparatus of the embodiment.

A detailed procedure of the communication processing executed by the electronic apparatus 10 will now be explained with reference to FIG. 9.

The connection modes in the close proximity wireless transfer method include the initiator mode and responder mode, as described above. If the close proximity wireless transfer device 20 is set in the initiator mode, it transmits a connection request signal to an external device (block B201). The connection request signal contains the device ID of the close proximity wireless transfer device 20. The close proximity wireless transfer device 20 stands by for a response signal from the external device. Upon receiving a response signal from the external device (block B202), a wireless connection between the close proximity wireless transfer device 20 and the external device is established.

Alternatively, if the close proximity wireless transfer device 20 is set in the responder mode, it regularly executes processing of detecting a connection request signal from an external device (block B201). The connection request signal contains the device ID of the external device. Upon receiving a connection request signal from the external device, the close proximity wireless transfer device 20 transmits a response signal added with its device ID to the external device (block B202).

The communication control program 12a extracts the device ID of the external device from the received connection request signal or response signal to detect the device ID of the external device as a communication partner (block B203). The communication control program 12a searches the database 201 by using, as a key, the device ID of the external device as a communication partner, and determines whether the database 201 stores a transmission rate corresponding to the external device as a communication partner (block B204).

If the database 201 stores the transmission rate corresponding to the external device (YES in block B204), the communication control program 12a extracts the transmission rate corresponding to the external device from the database 201 (block B205); otherwise (NO in block B204), the communication control program 12a uses, e.g., a predetermined reference rate as the transmission rate corresponding to the external device as a communication partner (block B206).

Before start of data transmission, the communication control program 12a executes negotiation processing with the external device as a communication partner, and determines content data to be transmitted. With this negotiation processing, the communication control program 12a acquires content information about the content data to be transmitted (block B207). If the electronic apparatus 10 transmits the content data to the external device, the communication control program 12a generates content information based on the content data to be transmitted. Alternatively, if the electronic apparatus 10 receives the content data from the external device, the communication control program 12a receives content information contained in the data transmitted from the external device in the negotiation processing. The content information indicates various attributes of the content data to be transmitted. More specifically, the content information represents, e.g., the data size, number, and type of files to be transmitted.

The communication control program 12a estimates a transmission time based on the transmission rate corresponding to the external device and the data size of the content data to be transmitted (block B208). More specifically, the communication control program 12a calculates an estimated transmission time by dividing the data size of the content data by the transmission rate.

As will be explained below, based on the estimated transmission time or the content information, the communication control program 12a determines whether to output the start tone indicating the start of transmission of the content data. First, the communication control program 12a determines whether the estimated transmission time is not less than a threshold value $TH_t$ (block B209). If the estimated transmission time is less than the threshold value $TH_t$ (NO in block B209), the communication control program 12a determines whether the data size of the content data is not less than a threshold value $TH_s$ (block B210). If the data size of the content data is less than the threshold value $TH_s$ (NO in block B210), the communication control program 12a determines whether the number of content items (files) to be transmitted is not less than a threshold value $TH_n$ (block B211). If the number of content items to be transmitted is less than the threshold value $TH_n$ (NO in block B211), the communication control program 12a does not output the start tone indicating the start of transmission.

On the other hand, if the estimated transmission time is not less than the threshold value $TH_t$ (YES in block B209), if the data size of the content data is not less than the threshold value $TH_s$ (YES in block B210), or if the number of content items to be transmitted is not less than the threshold $TH_n$ (YES in block B211), the communication control program 12a outputs the start tone indicating the start of transmission from the loudspeaker 17 (block B212).

The communication control program 12a then executes processing of transmitting the content data to be transmitted (block B213). At the end of transmission of the content data to be transmitted, the communication control program 12a outputs the end tone indicating the end of transmission from the loudspeaker 17 (block B214).

With the above processing, it is possible to appropriately notify the user of switching of the transmission situation of the content data based on the transmission time required to transmit the content data, the size of the content data, and the number of content items. Although communication state notification is controlled based on the calculated transmission time in the above flowchart, it may be controlled based on the transmission rate extracted from the database 201. It is also possible to set the threshold values based on, e.g., the duration of the start tone, as needed.

Figure 10:
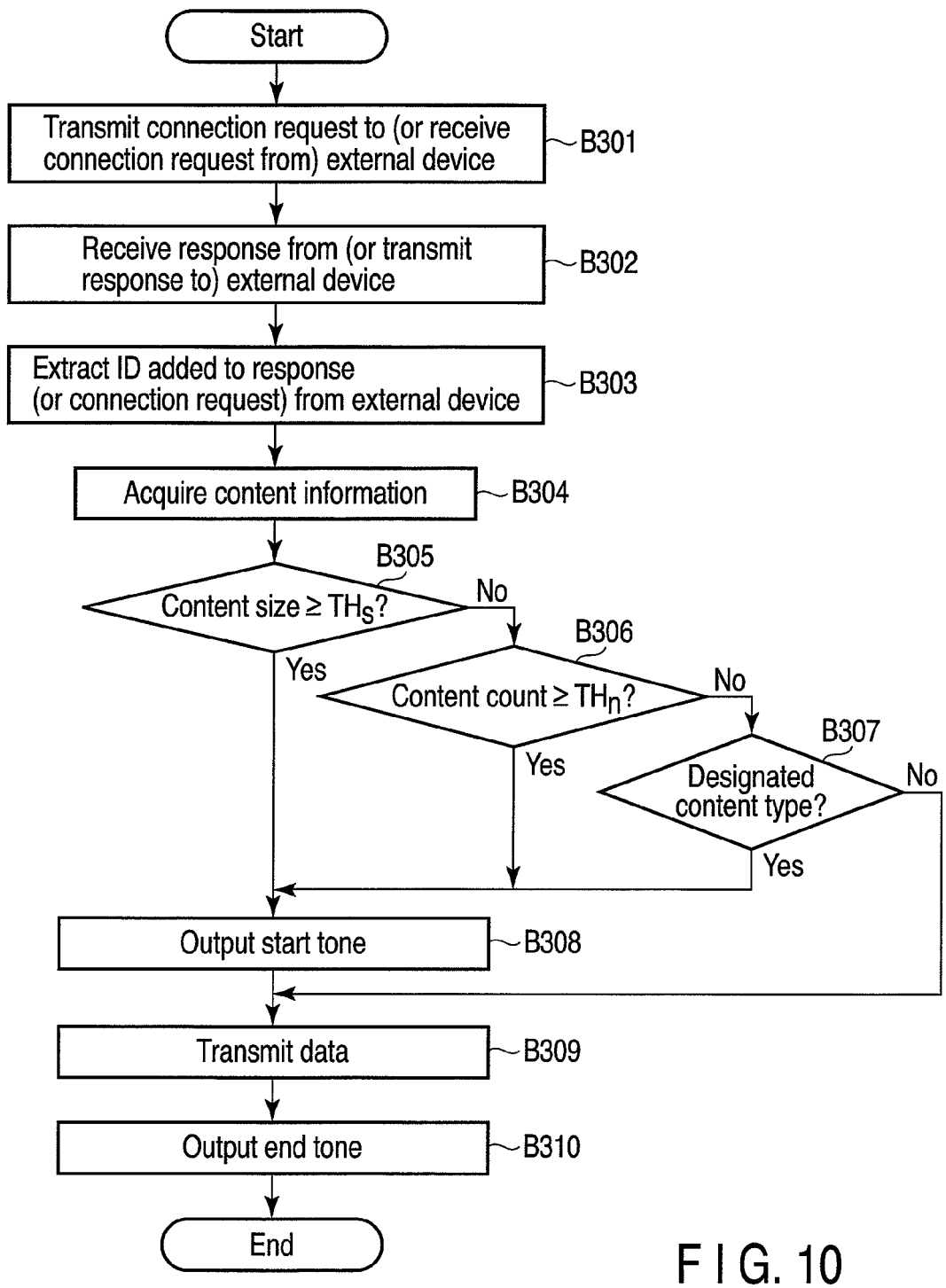
FIG. 10 is an exemplary flowchart for explaining another detailed procedure of the communication processing executed by the electronic apparatus of the embodiment.

FIG. 10 is a flowchart showing another detailed procedure of the communication processing executed by the electronic apparatus 10.

As described above, the connection modes in the close proximity wireless transfer method include the initiator mode and responder mode. If the close proximity wireless transfer device 20 is set in the initiator mode, it transmits a connection request signal to an external device (block B301). The connection request signal contains the device ID of the close proximity wireless transfer device 20. The close proximity wireless transfer device 20 stands by for a response signal from the external device. Upon receiving a response signal from the external device (block B302), a wireless connection between the close proximity wireless transfer device 20 and the external device is established.

Alternatively, if the close proximity wireless transfer device 20 is set in the responder mode, it regularly executes processing of detecting a connection request signal from an external device (block B301). The connection request signal contains the device ID of the external device. Upon receiving the connection request signal from the external device, the close proximity wireless transfer device 20 transmits a response signal added with its device ID to the external device (block B302).

The communication control program 12a extracts the device ID of the external device from the received connection request signal or response signal to detect the device ID of the external device as a communication partner (block B303).

Then, the communication control program 12a executes negotiation processing with the external device as a communication partner, and determines content data to be transmitted. With this negotiation processing, the communication control program 12a acquires content information about the content data to be transmitted (block B304). If the electronic apparatus 10 transmits the content data to the external device, the communication control program 12a generates content information based on the content data to be transmitted. Alternatively, if the electronic apparatus 10 receives the content data from the external device, the communication control program 12a receives content information contained in the data transmitted from the external device in the negotiation processing. The content information indicates various attributes of the content data to be transmitted. More specifically, the content information represents, e.g., the data size, number, and type of files to be transmitted.

The communication control program 12a determines based on the content information whether to output the start tone indicating the start of transmission of the content data, as will be described below. First, the communication control program 12a determines whether the data size of the content data is not less than the threshold value $TH_s$ (block B305). If the data size of the content data is less than the threshold value $TH_s$ (NO in block B305), the communication control program 12a determines whether the number of content items (files) to be transmitted is not less than the threshold value $TH_n$ (block B306). If the number of content items to be transmitted is less than the threshold value $TH_n$ (NO in block B306), the communication control program 12a determines whether the type of content items to be transmitted is a designated type (block B307). Note that the designated type of content is, e.g., a moving image file type whose data size is estimated to be large. That is, the communication control program 12a determines in block B307 whether the type of content items to be transmitted is, e.g., a moving file type. Based on, e.g., information on the type of content items detected from the content information or the extension of the file names of the content items, it is possible to determine the type of content items to be transmitted.

If the type of content items to be transmitted is not the designated type (NO in block B307), the communication control program 12a does not output the start tone indicating the start of transmission.

On the other hand, if the data size of the content data is not less than the threshold $TH_s$ (YES in block B305), if the number of content items to be transmitted is not less than the threshold $TH_n$ (YES in block B306), or if the type of content items to be transmitted is the designated type (YES in block B307), the communication control program 12a outputs the start tone indicating the start of transmission from the loudspeaker 17 (block B308).

The communication control program 12a then executes processing of transmitting the content data to be transmitted (block B309). At the end of transmission of the content data to be transmitted, the communication control program 12a outputs the end tone indicating the end of transmission from the loudspeaker 17 (block B310).

With the above processing, it is possible to appropriately notify the user of switching of the transmission situation of the content data based on the size of the content data, the number of content items, and the type of content items. Note that it is possible to set the threshold values based on, e.g., the duration of the start tone, as needed.

As described above, according to the embodiment, it is possible to appropriately notify the user of the communication state and its switching in close proximity wireless transfer. In this embodiment, it is possible to appropriately notify the user of the communication state by controlling output of a start tone indicating the start of transmission and an end tone indicating the end of transmission based on the data size, number, and type of content items, which are contained in content information about content data to be transmitted, and an estimated transmission time. Likewise, the LED of the indicator 18 is controlled to light continuously or flicker based on the content information and transmission time, thereby appropriately notify the user of the communication state. Therefore, the user can readily determine the communication state based on the output of the sound and light emitting of the LED, and perform an appropriate operation on the electronic apparatus 10.

Although a case in which the electronic apparatus 10 is implemented as a personal computer functioning as a station has been explained as an example in the embodiment, it is also possible to implement the electronic apparatus 10 as a portable apparatus such as a mobile phone or PDA.

The respective modules in FIG. 2 which have been described as software modules in the embodiment can be accomplished as hardware modules.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a communication module configured to execute close proximity wireless transfer;
   a content information receiver configured to receive content information of at least one content item to be transmitted between the communication module and an external device, by negotiation between the communication module and the external device; and
   a communication state notification module configured to execute either a first communication state notification process of outputting a start tone indicative of start of transmission of the at least one content item and an end tone indicative of end of transmission of the at least one content item or a second communication state notification process of suppressing output of the start tone and outputting the end tone, based on the received content information, when the at least one content item is transmitted between the communication module and the external device,
   wherein the communication state notification module is configured to determine whether a transmission time required to transmit the at least one content item is longer than a threshold time based on the received content information, to execute the first communication state notification process if the transmission time is longer than the threshold time, and to execute the second communication state notification process if the transmission time is equal to or shorter than the threshold time.

2. The electronic apparatus of claim 1, wherein the communication state notification module is configured to calculate the transmission time by dividing a data size of the at least one content item by a transmission rate of data transmitted using close proximity wireless transfer between the external device and the communication module.

3. An electronic apparatus comprising:
   a communication module configured to execute close proximity wireless transfer;
   a content information receiver configured to receive content information of at least one content item to be transmitted between the communication module and an external device, by negotiation between the communication module and the external device; and a communication state notification module configured to execute either a first communication state notification process of outputting a start tone indicative of start of transmission of the at least one content item and an end tone indicative of end of transmission of the at least one content item or a second communication state notification process of suppressing output of the start tone and outputting the end tone, based on the received content information, when the at least one content item is transmitted between the communication module and the external device, wherein the communication state notification module is configured to execute the first communication state notification process in at least one of cases where the data size of the at least one content item is equal to or larger than a first threshold value, where the number of the at least one content item is equal to or larger than a second threshold value, and where the type of the at least one content item is a predetermined type.

4. The electronic apparatus of claim 3, wherein the communication state notification module is configured to execute the second communication state notification process upon satisfaction of all the conditions where the data size of the at least one content item is smaller than the first threshold value, where the number of the at least one content item is smaller than the second threshold value, and where the type of the at least one content item is not the predetermined type.

5. The electronic apparatus of claim 1, wherein the communication state notification module is configured to skip outputting the start tone when executing the second communication state notification process.

6. A communication state notification method of notifying a communication state of close proximity wireless transfer executed between an external device and a communication module in an electronic apparatus, the method comprising:

receiving content information of at least one content item to be transmitted between the communication module and the external device by negotiation between the communication module and the external device; and executing either a first communication state notification process of outputting a start tone indicative of start of transmission of the at least one content item and an end tone indicative of end of transmission of the at least one content item or a second communication state notification process of suppressing output of the start tone and outputting the end tone, based on the received content information, when the at least one content item is transmitted between the communication module and the external device, wherein the executing comprises determining whether a transmission time required to transmit the at least one content item is longer than a threshold time based on the received content information, executing the first communication state notification process if the transmission time is longer than the threshold time, and executing the second communication state notification process if the transmission time is equal to or shorter than the threshold time.

7. The communication state notification method of claim 6, wherein the executing comprises calculating the transmission time by dividing a data size of the at least one content item by a transmission rate of data transmitted using close proximity wireless transfer between the external device and the communication module.

8. The communication state notification method of claim 6, wherein the executing comprises skipping outputting the start tone when executing the second communication state notification process.

* * * * *